United States Patent [19]

Loy

[11] Patent Number: 4,932,733
[45] Date of Patent: Jun. 12, 1990

[54] OPTO-MECHANICAL ANALYSIS SYSTEM USING A SINGLE ROTATING POLYGON

[75] Inventor: Fernand R. Loy, Sceaux, France

[73] Assignee: U.S. Philips Corp., New York, N.Y.

[21] Appl. No.: 197,079

[22] Filed: May 20, 1988

[30] Foreign Application Priority Data

May 22, 1987 [FR] France .................................. 87 07219

[51] Int. Cl.$^5$ ............................................. G02B 26/10
[52] U.S. Cl. ....................................... 350/6.8; 350/6.7
[58] Field of Search .................... 350/6.5, 6.6, 6.7, 6.8, 350/609, 616

[56] References Cited

U.S. PATENT DOCUMENTS

| | | | |
|---|---|---|---|
| 4,021,897 | 5/1977 | Fisli | 350/616 |
| 4,753,498 | 6/1988 | Saitoh et al. | 350/6.8 |
| 4,768,861 | 9/1988 | Epner | 350/6.8 |

FOREIGN PATENT DOCUMENTS 58-189609 11/1983 Japan ..................................... 350/6.7

Primary Examiner—Bruce Y. Arnold
Assistant Examiner—Loha Ben
Attorney, Agent, or Firm—William L. Botjer

[57] ABSTRACT

Opto-mechanical analyzer using a single polygon (P) comprising n reflective faces which are arranged parallel to the axis (2) of the cylinder in which the polygon is cut and are determined in such a way that their distribution on the periphery is sinusoidal. The polygon rotates about an axis (1) extending at an angle $\theta$ to the axis (2) and situated in the plane formed by the axis (2) and the axis (X X') on which the diameter of the cylinder extends. On either side of this diameter the reflective faces have been distributed pairwise parallel. The n faces of the polygon thus have n different inclinations with respect to the axis of rotation and the angular pitch is constant.

5 Claims, 4 Drawing Sheets

OPTO-MECHANICAL ANALYSIS SYSTEM USING A SINGLE ROTATING POLYGON

BACKGROUND OF THE INVENTION

The invention relates to an opto-mechanical analyzer using a single rotating element constituted by a polygon comprising n reflective faces.

Analysis systems are known in which a single rotating polygon is used whose n reflective faces are differently inclined with respect to the axis of rotation so as to scan the field to be analyzed in n contiguous bands of p lines, p being the number of detectors arranged in parallel. The total number of lines scanned in the field is thus np.

Polygons of this type must be manufactured separately, while controlling the inclinations of the different reflective faces with great precision. The angular width of a band determines the angular pitch of the different faces and each error in this pitch results in non-contiguous bands. This polygon is thus realized with difficulty and at high cost.

SUMMARY OF THE INVENTION

The analysis system according to the invention realizes the same type of scanning by means of a polygon of a different type in an easy manner and with the following advantages:
- possibility of simultaneously machining a plurality of polygons,
- use of one and the same polygon for different bandwidths,
- adjustable distance between the different bands.

To this end the invention is characterized in that the said reflective faces are arranged parallel to the axis of the cylinder in which the polygon is cut and are determined in such a way that their distribution on the periphery is sinusoidal, said polygon rotating about an axis, said rotational axis extending at a given angle $\theta$ to the axis of the said cylinder and passing through the geometrical center of the cylinder, said angle $\theta$ being fixed with respect to the said axis of rotation such that the latter is in the plane formed by the axis of the said cylinder and an axis on which the diameter of the cylinder extends. On either side of this diameter the reflective faces have been distributed pairwise parallel, the n faces of the polygon thus arranged having n different inclinations with respect to the axis of rotation and the angular pitch being constant and consequently the analysis bands being equidistant.

By varying the angle $\theta$, the angular pitch and hence the width of the analysis bands can be modified and the juxtaposition of these bands can be adjusted very correctly.

BRIEF DESCRIPTION OF THE DRAWING

The invention will now be described in greater detail, by way of example with reference to the accompanying drawings in which.

DETAILED DESCRIPTION OF THE INVENTION

Figure 1:
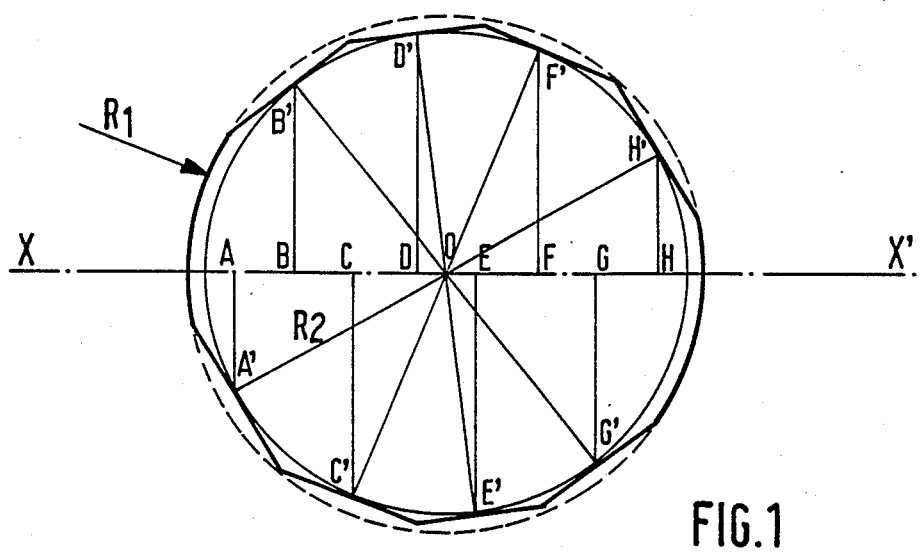
FIG. 1 shows the distribution of the faces on the periphery of the cylinder in which the polygon according to the invention is cut.

The polygon is cut on a cylinder having a radius $R_2$. A section through this cylinder in accordance with a plane perpendicular to its axis is shown in FIG. 1.

In the chosen example the polygon has 8 faces for analysing 8 bands.

The repetition of the faces is determined in the following manner: equidistant points A-B-C-...-G-H are marked on the axis XX' such that the centre O of the cylindrical section is in the middle of the segment DE.

Subsequently the positions of the points A'-B'-C'-...-G'-H' are alternately determined on each semi-circumference with a radius $R_1$ which is smaller than $R_2$ such that the projection of A' on the axis XX' is A, etc.

A'-B'-C'-...-G'-H' are thus the centres of the 8 reflective faces.

With respect to the axis XX' the cutting angles of the faces are expressed as:

$$\cos AOA' = AO/R_1, \cos BOB' = BO/R_1 \ldots \cos H'OH = RO/R_1$$

$R_1$ is the distance between the different faces and the axis of the cylinder.

The distribution of the faces on the periphery is thus sinusoidal.

It is to be noted that the two opposite faces of the polygon are symmetrical with respect to the point O. The polygon is thus balanced with respect to the axis of the cylinder in which it has been cut.

It is also to be noted that a part of the cylinder of the radius $R_2$ is not cut. Its utilization will be apparent hereinafter.

Figure 2:
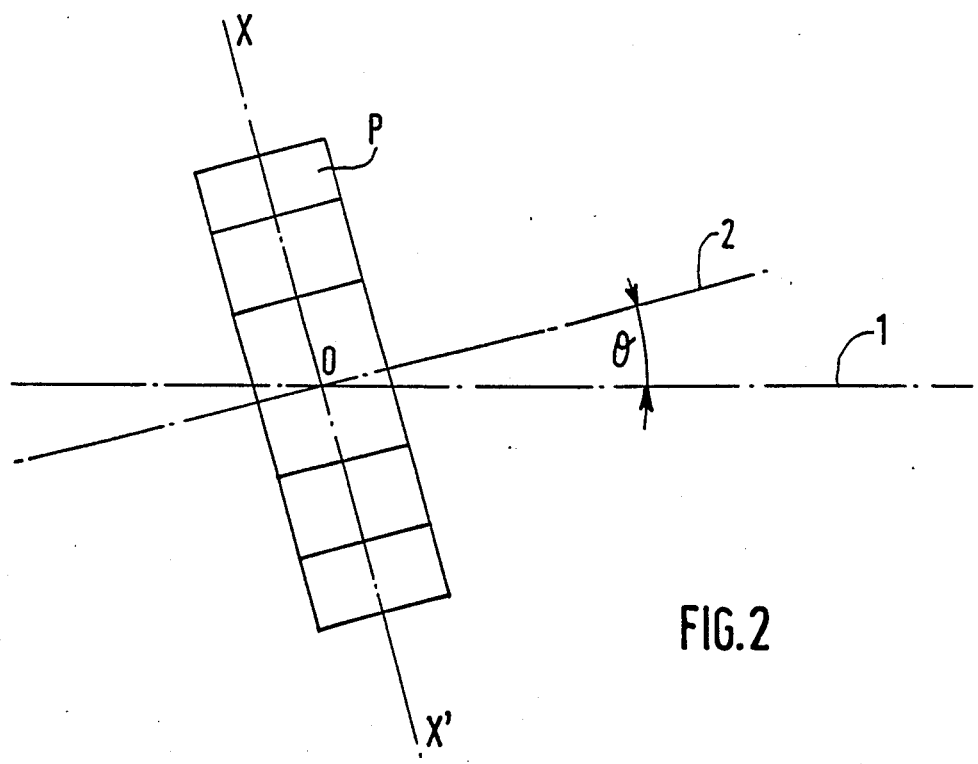
FIG. 2 shows the arrangement of the analyzer according to the invention.

FIG. 2 shows the arrangement of the analyzer in which the polygon P all of whose faces are parallel to the axis 2 of the cylinder rotates about the axis of rotation 1, the latter extending at an angle $\theta$ to the axis 2.

The polygon is fixed with respect to the axis of rotation 1 such that the three axes XX', 2 and 1 are in the same plane.

If this condition is fulfilled, the eight faces of the polygon have eight different inclinations with respect to the axis of rotation 1 and the angular pitch is constant.

The angle between the axis of rotation 1 and the normal OA' to the face with centre A' is:

$$\alpha = \theta \cos AOA' \text{ or } \cos AOA' = AO/R_1$$

so $\alpha = AO\ \theta/R_1$ and also $\beta = BO\ \theta/R_1$, $\gamma = CO\ \theta/R_1$, etc.

It can thus be seen that the angles $\alpha$, $\beta$, $\gamma$, etc. are proportional to the segments AO, BO, CO, ... etc. which are chosen such that $AB = BC = CD = \ldots = GH$.

It can also be seen that $\alpha$, $\beta$, $\gamma$ are proportional to $\theta$.

Due to this property the angular pitch can be varied by varying $\theta$ and thus the width of the analysis bands which are always equidistant can be varied.

Figure 3:
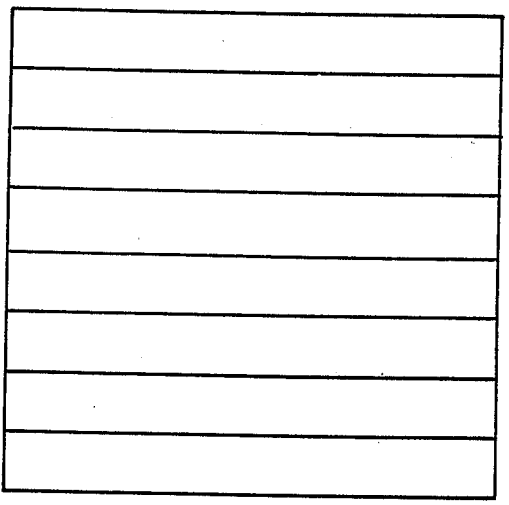
FIGS. 3 and 4 show the variation of the analyzed field when varying the angle $\theta$ in the ratio 1/2.
Figure 4:
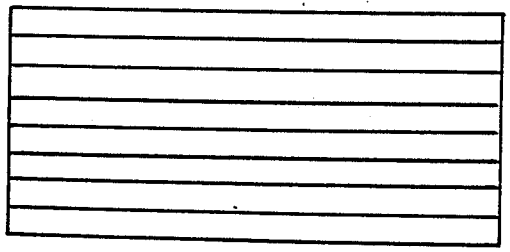

In practice this means that by utilizing the same polygon arranged in a different way with respect to the axis of rotation, it is possible to analyze either a square field of 8 bands, for example shown in FIG. 3, or a rectangular field of the format 1/2 shown in FIG. 4 by changing the angle of inclination of the polygon from $\theta$ to $\theta/2$.

The portion of the cylinder having the radius $R_2$ which remains after milling the plane faces is made non-reflective by depositing a matte and absorbing coating. This surface can advantageously be used as a temperature reference which appears twice during the formation time of an image.

Since the faces of the polygon are parallel to the axis of the cylinder in which it is cut, several cylinders can be stacked on the same axis for simultaneously milling the several polygons. The result is a considerable reduction of manufacturing costs.

Figure 5:
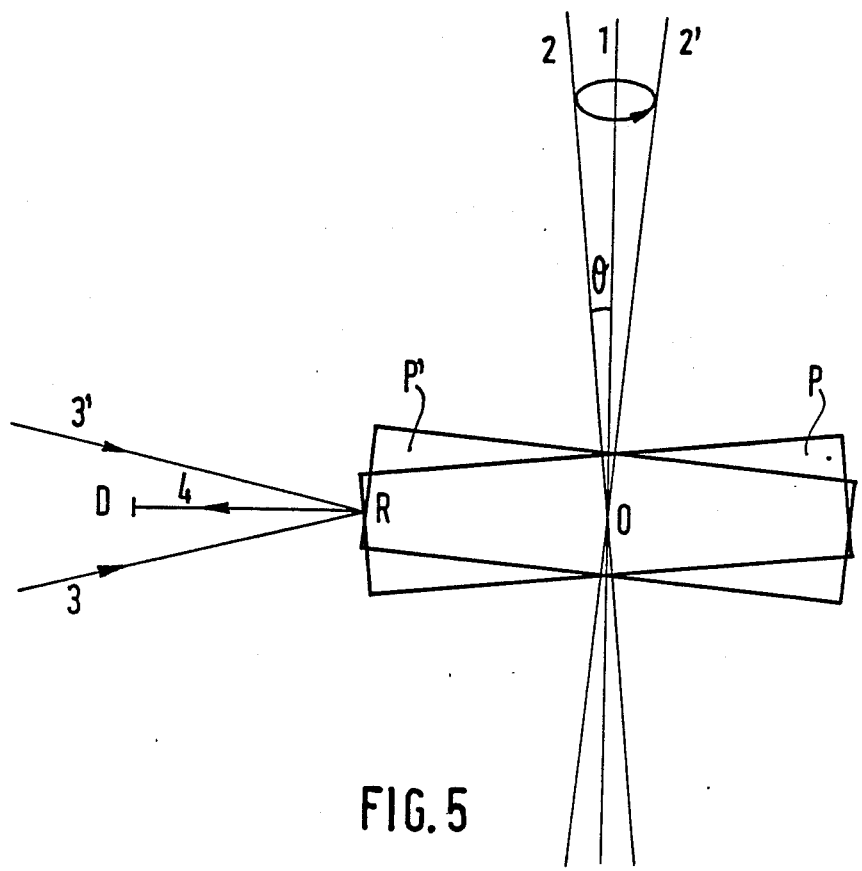
FIG. 5 shows the field of view of the analyzer corresponding to the vertical scanning of the polygon.

FIG. 5 shows two positions P and P' of the polygon rotating about the axis 1 and corresponding to the successive passages of the axis of the cylinder through 2 and 2' in the plane of the Figure. The incident light rays 3 and 3' bound the field of view of the analyzer corresponding to the vertical scanning. These rays are reflected at the point J which is common to the positions P and P' of the polygon along with the ray 4 towards the detector D. It can be seen that the axis 2 describes a cone with an apex angle $\theta$ around the axis 1.

Figure 6:
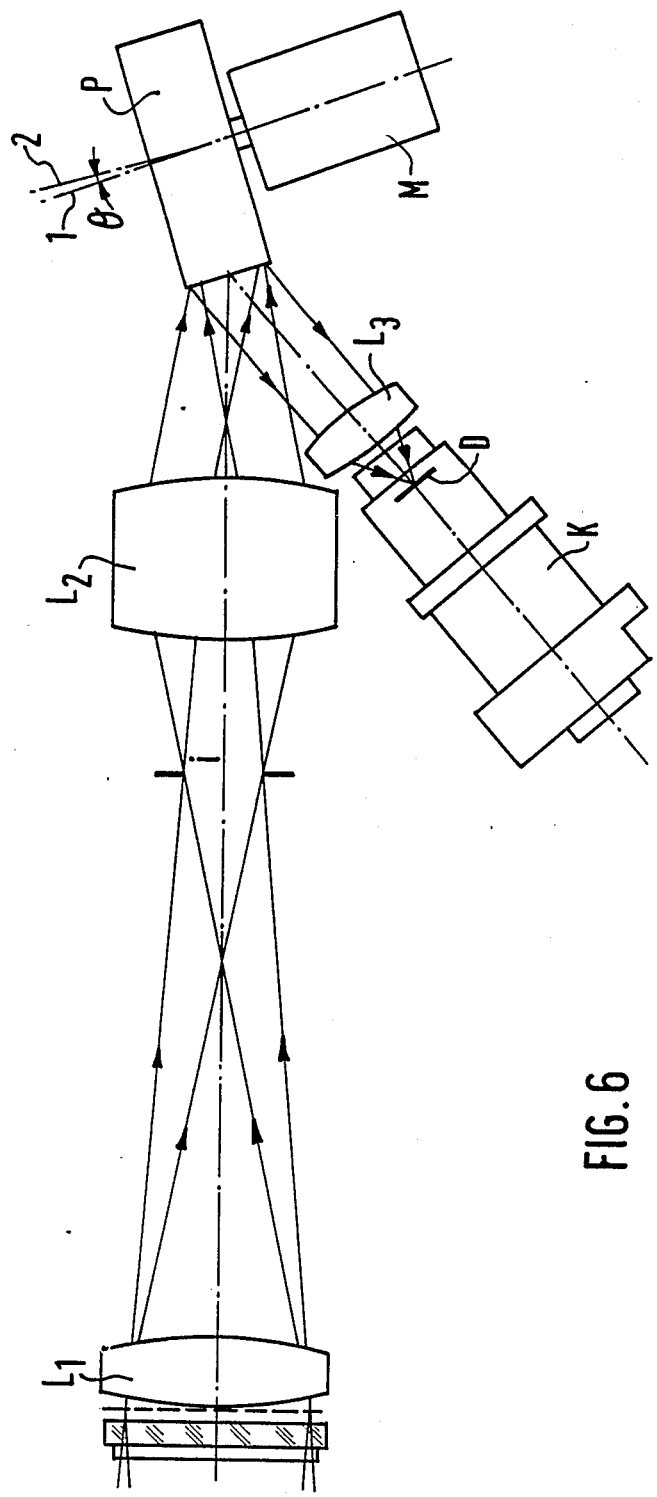
FIG. 6 shows the diagram of a practical embodiment of the analyzer.

FIG. 6 shows a diagram of an embodiment of the analyzer. The motor M rotates the polygon P abouts its axis 1 extending at an angle $\theta$ to the axis 2 of the polygon.

An afocal system constituted by optical assemblies $L_1$ and $L_2$ forms an intermediate image i of the scene. After reflection on the polygon the beam is focussed by means of the lens $L_3$ on the mosaic of detectors D cooled by means of the cryogenic device k.

What is claimed is:

1. An opto-mechanical analyzer comprising a single rotational element, said rotational element including n reflective faces arranged in a polygon, said n reflective faces being parallel to the central longitudinal axis of a cylinder in which said polygon is cut, said n reflective faces being distributed in equal quantities on opposite sides of a transverse axis, said transverse axis intersecting and being at a right angle with said longitudinal axis, said rotational element being adapted for rotation about a rotational axis, said rotational axis passing through the intersection of said longitudinal and transverse axes and extending at a fixed angle $\Theta$ to said longitudinal axis, said longitudinal, transverse and rotational axes being coplanar and intersecting at a point which is the geometrical center of said cylinder, reflective faces on opposite ends of a diametrical line of said cylinder being parallel one to the other, the end faces of said polygon having n different inclinations relative to said axis of rotation, said angle $\theta$ generating a constant angular pitch which produces equidistant analysis bands.

2. An opto-mechanical analyzer as claimed in claim 1, wherein each of said reflective faces is tangent at its center to a common circle, each of said faces being contiguous with at least one adjacent face, perpendicular projections on said transverse axis of the centers of any two adjacent faces being separated by a distance which is constant.

3. An opto-mechanical analyzer as claimed in claim 2, wherein the least distance from said longitudinal axis of any of said projections is ¼ of said constant distance, the distribution of said faces on the periphery of said polygon being sinusoidal.

4. An analyzer as claimed in claim 1, wherein the variation of said angle $\theta$ permits the variation of the angular pitch and hence the width of the analysis bands, and the exact adjustment of the juxtaposition of said bands.

5. An analyzer as claimed in claim 1, wherein the polygon includes two cylindrical zones on its periphery which are diametrically opposite to each other and which are rendered non-reflective by deposition of a matte and absorbing coating so as to be advantageously utilized as a temperature reference which appears twice during a period of forming an image.

* * * * *